AUTOMATIC GROUND-AIR COMMUNICATION SYSTEM

Filed May 29, 1961 4 Sheets-Sheet 1

INVENTORS
EDMUND B. STAPLES
AND HARRY SCHECTER
BY
Wade Koontz
Willard R Matthews Jr.
ATTORNEYS

AUTOMATIC GROUND-AIR COMMUNICATION SYSTEM

Filed May 29, 1961 4 Sheets-Sheet 2

INVENTORS
EDMUND B. STAPLES
AND HARRY SCHECTER
BY
Ware Kountz ...
Willard R. Matthews Jr.
ATTORNEYS

AUTOMATIC GROUND-AIR COMMUNICATION SYSTEM

Filed May 29, 1961 4 Sheets-Sheet 3

INVENTORS
EDMUND B. STAPLES
AND HARRY SCHECTER
BY
Wade Koontz
Willard R Matthews, Jr.
ATTORNEYS Dec. 15, 1964 E. B. STAPLES ETAL 3,161,871

AUTOMATIC GROUND-AIR COMMUNICATION SYSTEM

Filed May 29, 1961 4 Sheets-Sheet 4

INVENTORS
EDMUND B. STAPLES
AND HARRY SCHECTER
BY
Wade Koontz
Willard R Matthews, Jr.
ATTORNEYS 3,161,871
AUTOMATIC GROUND-AIR COMMUNICATION SYSTEM Edmund B. Staples, Fairborn, Ohio, and Harry Schecter, 233 Massachusetts Ave., Arlington 74, Mass.; said Staples assignor to the United States of America as represented by the Secretary of the Air Force Filed May 29, 1961, Ser. No. 113,559
5 Claims. (Cl. 343—6)
(Granted under Title 35, U.S. Code (1952), sec. 266)

The invention described herein may be manufactured and used by or for the United States Government for governmental purposes without payment to us of any royalty thereon.

This invention relates generally to ground station-aircraft communication systems and more especially to a digital system capable of achieving maximum information transfer through optimum coding techniques in which system said information may be easily stored, transferred, regenerated, multiplexed and organized.

An airborne instrumentality in order to fly successfully an interception mission, execute a blind landing, or perform other ground controlled maneuvers must be able to receive and assimilate information relating to its own orientation, flight commands and in the case of air interceptors, orientation of the target. Information such as heading, altitude, target bearing, target altitude and closing speed must be determined and reliably transmitted to the airborne instrumentality in the matter of seconds. It is essential to the successful operation of such a system that such information be processed and transmitted rapidly with a high degree of dependability. It is a further requirement of the system that it must distinguish between noise or other interference and the transmitted message.

While the subject ground-air communication system was intended primarily for military application relative to ground controlled interceptors, said system is readily adaptable to, and may be used in conjunction with, or incorporated in, return to base navigation systems, air traffic control systems, ground controlled approach systems, blind landing and taxi control systems, missile control systems and commercial aircraft control systems.

Accordingly, it is one object of our invention to provide an automatic ground-air communication system wherein information obtained by radar means is transmitted in coded digital form from a ground station to an airborne instrumentality, which airborne instrumentality receives and decodes said digitalized information and responds in compliance therewith.

It is a further object of the present invention to provide, in combination with said ground-air communication system, a novel encoding and decoding means whereby optimum information transfer is achieved and maximum security and dependability requirements are retained.

It is a further object of the present invention to provide, in combination with said ground-air communication system, a novel recognizer means whereby any transmitted coded digital information may be distinguished from random or intentional interference noise and reproduced in substantially its original form for supervisory and command use in the airborne instrumentality.

It is a further object of the subject invention to provide a ground-air communication system of the type described including, as an integral part thereof, radar beacon means located on the airborne instrumentality whereby information relating to said airborne instrumentality may be transmitted to the ground station.

It is a further object of the subject invention to provide a ground-air communication system which is particularly adaptable to multiplexing and the transmission of a plurality of simultaneous commands.

It is a further object of the present invention to provide, in combination with said ground-air communication system, encoding means wherein inteligence in parallel digital form is converted to intelligence in serial digital form for the purpose of optimum transmission; and decoding means wherein said intelligence in serial digital form is reconverted to intelligence in parallel digital form in which form it s most readily adaptable to activate the transducers which operate said airborne instrumentality.

It is a further object of the present invention to provide a ground-air communication system of the type described herein which will be adaptable to and may be incorporated in return to base navigation systems, air traffic control systems, ground control approach systems, missile control systems and commercial aircraft control systems.

For a better understanding of the present invention, together with other and further objects thereof, reference is had to the following description taken in connection with the accompanying drawings wherein.

The subject ground-air communication system participates as an element in a group of equipment which constitute an automatic aircraft control system wherein one or more manned or fully automatic airborne instrumentalities are controlled in accordance with commands issued from a ground station.

In general the subject invention comprises a system in which ground station radar equipment explores the aircraft positions in space, digital radar relay equipment discriminates radar targets from noise and encodes the position of said targets into binary digital form, a computer means determines the direction angle said aircraft should fly, an encoding means translates the output of said computer means into coded azimuth information, and modulator and transmitter equipment transmits said coded azimuth information to the airborne instrumentality. Each airborne instrumentality has installed in it a receiver capable of receiving the transmitted commands, recognizer equipment capable of differentiating between said transmitted commands and noise or jamming signals, decoding means, and a transducer to actuate the controls of said airborne instrumentality in response to said commands.

Figure 1:
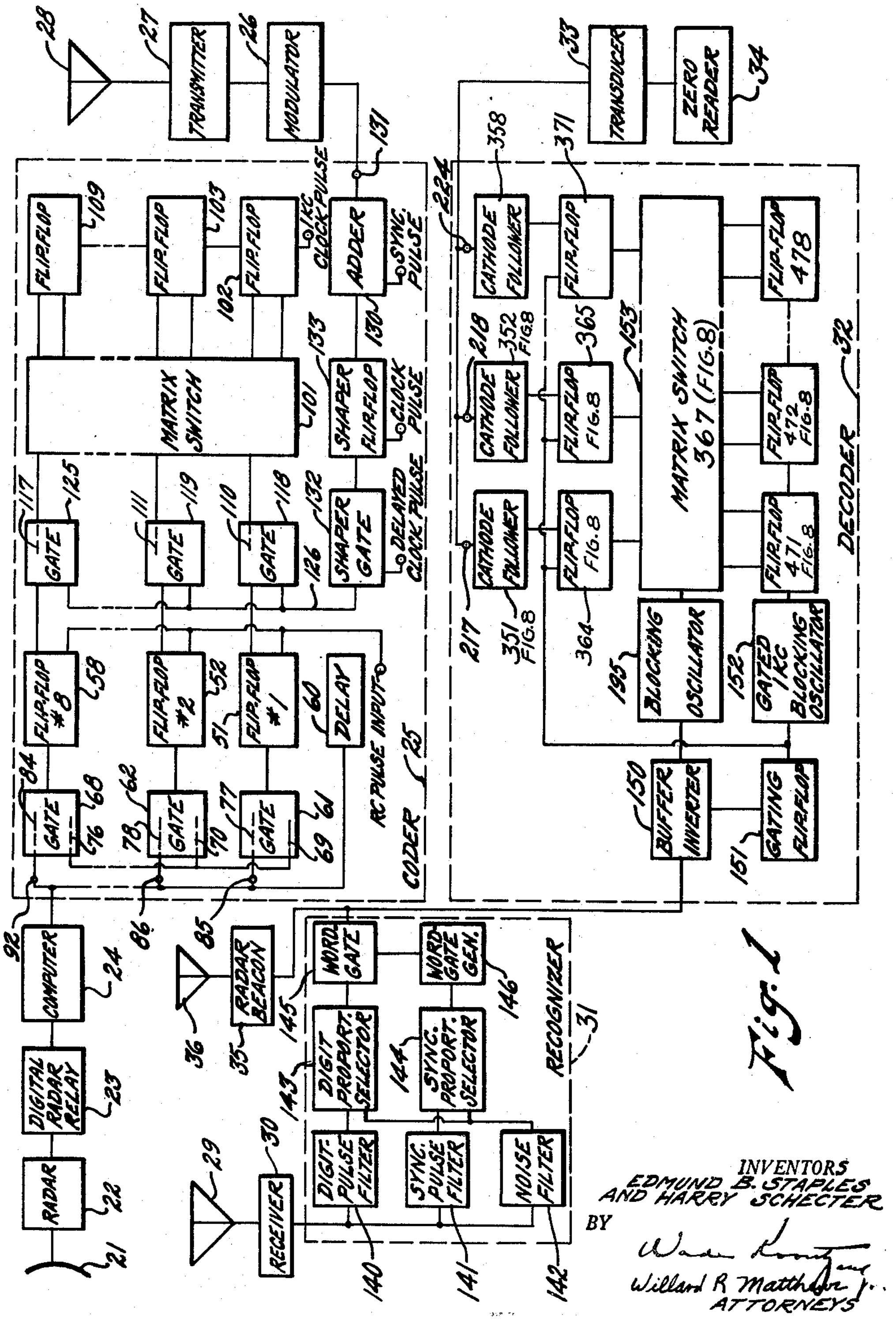
FIG. 1 is a block diagram of a ground-air communication system embodying principles of our invention.
Figures 2, 3, 5:
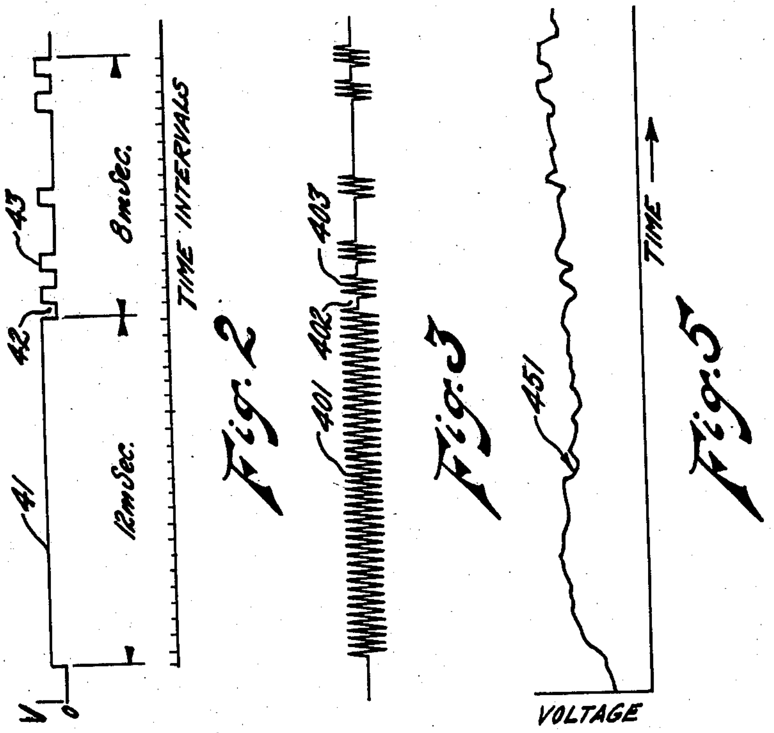
FIG. 2 illustrates the output waveform generated by the coder stage of our invention.
FIG. 3 illustrates the output waveform generated by the transmitter stage of our invention.
FIG. 5 illustrates the waveform representing a typical output of the receiver stage of our invention.

Reference is made to FIG. 1 wherein a block diagram of one embodiment of our invention is illustrated. Radar means 22 generates new target information every fifteen seconds, the rotation of antenna 21 being four r.p.m. The output of radar means 22 is applied to digital radar relay 23, which digital radar relay 23 determines the radar targets, converts the coordinates of said radar targets into binary digital form and transmits the azimuth information relating thereto to computer 24. Apparatus suitable to perform these target determining and digital computing functions may take the form indicated FIGS. 10, 18 and 20 of the drawings of U.S. Patent No. 2,825,-054 granted to M. L. Ernst on Feb. 25, 1958, and digital course pulses such as those indicated in FIG. 20 of said Ernst patent may be delivered to encoder circuitry such as is illustrated in block form within enclosure block 25 occupying the upper right portion of FIG. 1 of the drawings herein, and hereinafter referred to as "coder 25". For each scan of antenna 21 computer 24 computes a new azimuth command which becomes briefly available at its output register. About four microseconds after the command first appears, computer 24 signals the presence of the command by also furnishing a very short read-command pulse. The command endures thereafter for eleven more microseconds during time coder 25 clears itself of existing information and replaces it with the new command. The new command will endure in coder 25 until a succeeding new computer output presents itself fifteen seconds later. In response to said read-command pulse, coder 25 at once proceeds to convert its input, which comprises parallel code in which all digits occur simultaneously, each on a separate wire, into a medium speed serial code which has been adapted as particularly appropriate and convenient for radio transmission. The code word generated by coder 25 lasts 20 milliseconds and is illustrated in FIG. 2. The initial twelve millisecond continuous signal pulse 41 serves to alert receiver 30 which is located in the airborne instrumentality. The first digit of the azimuth command is represented by .5 millisecond signal pulse 43 which follows .5 millisecond off interval 42 immediately succeeding said twelve millisecond alert signal 41. Coder 25 output is zero if the digit is zero and V volts if the digit is one. Alternate .5 millisecond signal pulse and off periods convey the desired command. This output is generated just once each time computer 24 supplies a new input.

The output of coder 25 is applied to modulator 26. The output waveform of modulator 26 differs from its input only in that there is some rounding of the pulse leading and trailing edges and some unimportant loss of low frequency components. The output is of high power level sufficient to turn transmitter 27 completely off for zero digits of the code word and completely on during the alert signal pulse and one digits of the code word.

The output of transmitter 27 is an interrupted continuous wave and is illustrated in FIG. 3. Signal pulses 401, 402 and 403 correspond respectively to signal pulses 41, 42, 43 of FIG. 2. Peak power during the pulse is about 70 watts and the frequency of operation is .133 kmc.

The signal is radiated from antenna 28 which consists of a single vertical dipole arrangement.

The signal thus radiated is received by antenna 29 and receiver 30 which are located in the airborne instrumentality. Antenna 29 and receiver 30 are of conventional design for VHF ground to air communication with some modification in the receiver signal output and automatic volume control circuits. The signal circuit is of broader bandwidth than conventional to facilitate handling the moderately steep data digit waveform. The automatic volume control has its time constant adjusted to cause activation primarily in response to noise rather than signal.

The output of receiver 30 is applied to recognizer 31, which performs the function of examining said output and determining which fluctuations are message pulses and which are noise. Recognizer 31 contains two filters which operate on the output of receiver 30 wherein one filter discriminates in favor of a signal having the characteristics of a message digit pulse and the other filter discriminates in favor of a signal having message synchronizing pulse characteristics. Recognizer 31 also takes as an input the automatic volume control bus voltage of receiver 30, that voltage being a measure of the slowly-varying mean of external ambien noise and internal receiver noise. By comparing the instantaneous outputs of the digit and synchronizing filters with the prevailing noise mean, the recognizer can decide intelligently whether the receiver output at the moment is in all probability just noise, or synchronizing pulse, or a message one digit. When the equipment concludes that a synchronizing pulse has occurred and is followed by some particular code of data digits, an internal trigger generator synthesizes a new rectangular wave output that reproduces the input code word in "noise-free" form. The input to decoder 32 is therefore a replica of the output of coder 25.

Decoder 32 performs a process inverse to that of coder 25 and translates a serial code at its input to a parallel one at its output. A multiplicity of terminals are available at the output of decoder 32, each providing V volts when the received command is a one in the corresponding digit position and zero volts when the received command is a zero. Decoder 32 contains a local clock oscillator having a one millisecond oscillation period. The clock is normally inoperative, but is triggered "on" by the trailing edge of the synchronizing pulse whenever a message is received. After triggering, the clock continues to run for eight milliseconds during which time it synchronously sorts the serial incoming pulses toward the corresponding output terminals. Associated flip-flop stages then hold each output terminal "locked-up' so that after a command has been received that code continues to be held in the decoder output until it is replaced by the arrival of a new comamnd.

The output circuits of decoder 32 operate relays which drive transducer 3 wherein the parallel code pulses are converted into the equivalent analogue signals now universally used for aircraft instrumentation. Transducer 33 is one in which each relay, when closed, energizes one of a set of fixed contacts ararnged circumferentially on a rotary switch. The rotor of the switch is turned by a motor until the energized fixed contacts are met by particular rotor contacts. This event occurs at some unique shaft position whereat the motor stops and the shaft is in angular correspondence with the incoming parallel code.

The output shaft of transducer 33 positions a synchronizer in the heading servo of Zero Reader 34 causing it to compute flight at the command heading and instruct the pilot accordingly, or in the case of completely automatic operation of the airborne instrumentality, the shaft will position a synchronizer in an appropriate auto pilot servo loop.

The unique and novel characteristics of the coder recognizer and decoder stages, both severally in the novel combination herein disclosed, are believed to be fundamental to the present invention and, therefore, warrant more detailed description. The particular embodiment of the subject data link system described herein was designed for sending eight digit commands, but since in principle the system may be adapted to send unlimited digit commands the specific embodiment herein described is to be taken as exemplary and not as limiting the invention.

Figure 4:
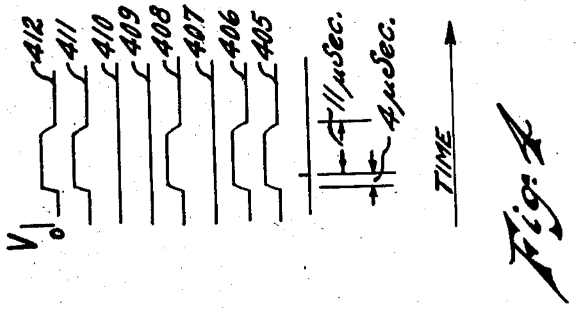
FIG. 4 illustrates the parallel output pulses of the computer stage of our invention.

The input to the coder is the binary number contained in the computer parallel output register, as shown in FIG. 4. Waveforms 405 through 412 appear respectively at terminals 85 through 92 of coder 25. The function of the coder is to produce a corresponding serial output of 0.5 millisecond digit-pulses separated by 0.5 millisecond off intervals and preceded by a 12 millisecond synchronizing pulse, as shown in FIG. 2. When a new number is set up in the computer register, the computer generates a read-command pulse, and the number remains in the register for about eleven microseconds. Since the number must be available in the coder for about twenty milliseconds it is necessary to transfer it to the coder register. The read-command pulse clears flip-flops 51–58, which flip-flops constitute the coder register, and after an eight millisecond delay in time delay means 60, the digit pulses are applied simultaneously to control grids 69–76 of gate tubes 61–68. The suppressor grids 77–84 in each case are connected to computer outputs 85–92.

If there is a one in the output, the gate tube will conduct and trigger the associated flip-flop into the one position. The number in the computer register is thus transferred into the coder register, where it remains until cleared by the next read-command pulse.

The conversion of the number stored in the coder register into serial form is accomplished through the use of an electronic commutator, which effectively samples each of the register flip-flops in time sequence. The commutator used is matrix switch 101 driven by the counting chain of flip-flops 102–109, which flip-flops are triggered by one kilocycle clock pulses. Each of the eight outputs of matrix switch 101 is connected to control grids 110–117 of gate tubes 118–125, the suppressor grid being coupled to one of the flip-flops in the coder register. If there is a one stored in the register flip-flop, gate tube 118 will conduct for a period of one millisecond, the duration of the matrix output pulse. The outputs of the eight gate tubes 118–125 are collected on common bus 126 and comprise, in serial form, the number of digits stored in the register.

The problem now is to reduce the duration of the digit pulses from one to one-half milliseconds, and to combine them properly with the twelve millisecond synchronizing pulse that must precede them. This is accomplished in the following manner. The synchronizing pulse, as well as the required clock pulses, is supplied in proper time sequence by a synchronizing generator each time the read-command pulse is received. The generator, which is not included in the figure, also furnishes the clock pulses mentioned above by triggering the counting chain for the matrix switch. Immediately on receipt of the read-command pulse, a twelve millisecond synchronizing pulse is applied to adder 130 and is passed on to coder output terminal 131. Next, the common gate output 126 is supplied to shaper gate 132, that has for its second input, clock pulse delayed by one-half millisecond. The output of this stage triggers shaper flip-flop 133 which is reset one-half millisecond later by an undelayed clock pulse. One-half millisecond digit pulses result at the input to adder 130 and are passed through, and thus follow the synchronizing pulse from the coder output terminal.

The function of the recognizer stage is to examine the output of the airborne receiver and to determine from that noise degraded signal, which fluctuations are transmitted commands and which are noise. FIG. 5 presents a typical receiver output in which waveform 451 illustrates the degree to which a signal may be degraded.

Referring now to recognizer 31 of FIG. 1 which illustrates one embodiment of the recognizer stage adapted for use in our invention, the output of receiver 30 is applied simultaneously to digit pulse filter 140, synchronizing pulse filter 141 and noise filter 142. Digit pulse filter 140 is a very efficient L-C section, that is, when its output consists of noise and of message digit-pulses, the latter essentially rectangular and of 0.5 millisecond duration, the filter peak output from noise is low and the output from digit-pulses relatively high. Synchronizing pulse filter 141 is a similar section adjusted to discriminate in favor of the message synchronizing pulse. Noise filter 142 is an RC section whose output is a measure of the mean signal coming into the recognizer. The mean is averaged over a time so long that it is indifferent to the presence or absence of a command during the averaging interval. On the other hand the averaging time is such that the output reflects as quickly as possible the changing ambient noise field in which the receiver operates.

The outputs of digit pulse filter 140 and of noise filter 142 are fed to proportional selector 143 which examines the ratio between the two. Whenever the ratio between digit-pulse filter 140 and noise filter 142 is too high to have resulted from noise alone, a digit-pulse is presumed to be present; at all other times it is presumed that no digit-pulse is being transmitted. Whenever the presence of a signal is presumed, the applicable selector provides a fixed output of V volts, no matter what the particular high value of input ratio is. Otherwise the selector provides zero volts, no matter what the particular low value of input ratio is. In this way the output of proportional selector 143 is a rectangular-wave replica of the signal which it considers to have been transmitted. The replica, when it is allowed to pass through a word gate 145 operates the airborne decoder unit.

Note that the replica will include a synchronizing pulse, since short-period (wide-band) digit pulse filter 140 will pass the long-period (narrow-band) synchronizing energy. However, the digit filter parameters are not proper to pass the synchronizing energy at optimum signal-to-noise ratio. When something that seems to be a replica of a synchronizing pulse first appears, that is not, by itself, dependable for initiating decoder unit operation. Consequently, proportional selector (sync) 144 is provided which is fed from the outputs of synchronizing pulse filter 141 and noise filter 142. This selector in operation is identical to the one for digits, but puts out V′ volts when the occurrence of a synchronizing pulse may be presumed. When V′ volts appear, the co-existing output of proportional selector (digit) 143 is then reliably acceptable as a synchronizing pulse. It, and the replica message digits that follow, can be admitted through word gate 145 to operate the decoder unit.

Word gate 145 is normally non-conducting. When V′ appears, it triggers "on" word gate generator 146 which word gate generator in turn biases word gate 145 to conduction. Decoder operation is then initiated by the trailing edge of the synchronizing pulse replica. Next the decoder sorts the eight following digit replicas into its corresponding parallel output terminals. Finally the decoder signals to the recognizer unit that it has completed the command, which signal pulse resets the word gate generator to its "off" condition, so that the word gate 145 again becomes non-conducting. The recognizer is again ready to consider a new input from the receiver.

Figure 6:
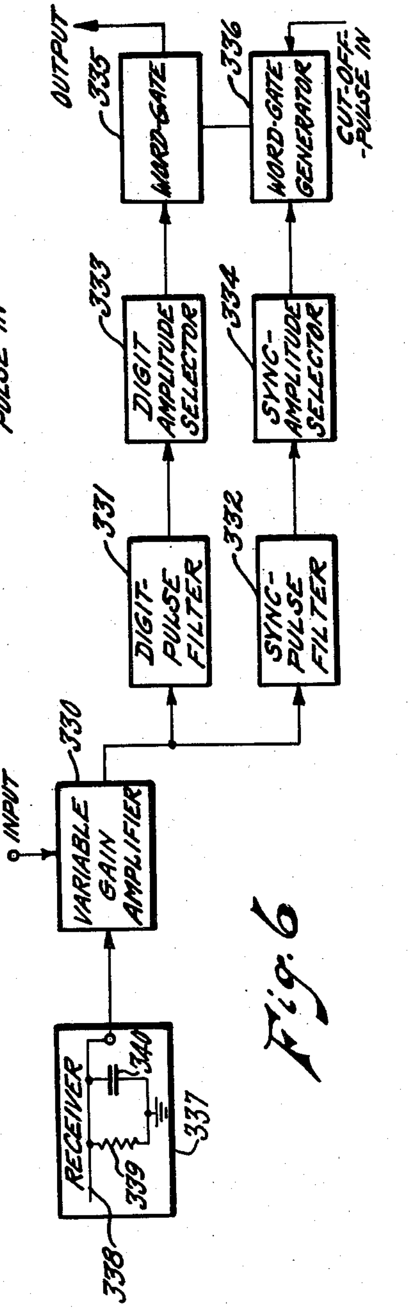
FIG. 6 illustrates a block diagram of the physical arrangement of the recognizer unit used in one embodiment of our invention.

A practical configuration for the recognizer is shown in FIG. 6. Here proportional selectors 143, 144 are replaced by amplitude selectors 333, 334, variable gain amplifier 330 and radio receiver 337, which radio receiver includes automatic volume control bus 338. Noise filter 142 of FIG. 1 appears as the automatic volume control bus filter in receiver 337 and comprises resistor 339 and capacitor 340. The overall gain of receiver 337 and variable gain amplifier 330 is controlled by the automatic volume control voltage so that the video input components of noise alone, at frequencies within the pass band of the noise filter, produce a constant-level video output from variable gain amplifier 330. Amplitude selectors 333 and 334 are of the conventional type that provide V volts if the instantaneous amplitude at their input exceeds a pre-established value, and essentially zero volts if it does not. This combination of noise leveling and fixed amplitude selection is equivalent to the use of a truly proportional (ratio) selector. Additionally, as a beneficial second order effect, extremely strong signals do produce a slight automatic volume control action that ensures against undesirable signal-saturation effects in the receiver intermediate frequency stages.

Figure 7:
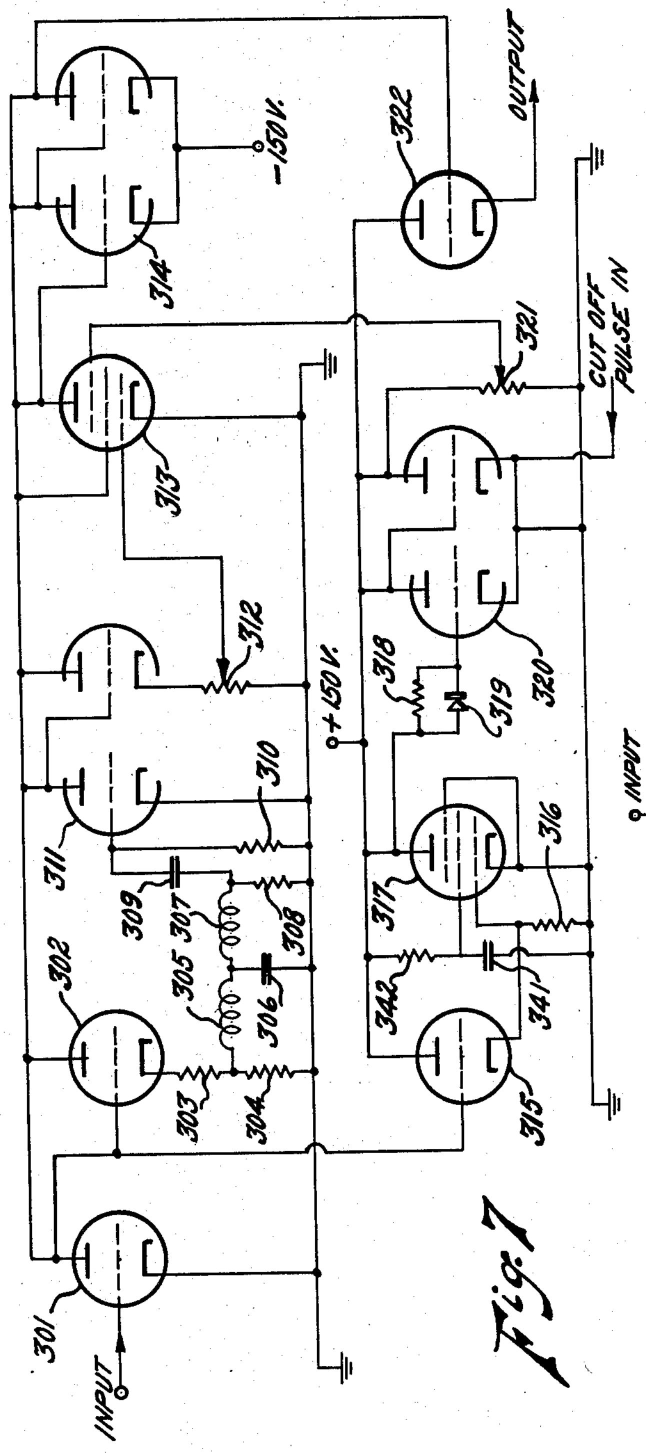
FIG. 7 illustrates a schematic wiring diagram of the recognizer unit.

A schematic diagram of the recognizer stage is illustrated by FIG. 7 wherein variable resistors 312 and 321 constitute means for varying the gain factor of amplifier 330, the latter being shown in FIGURE 7 as incorporated in tubes 301, 302, 311, 313 and 314. The input from receiver 337 is applied to the grid of triode 301, the output of which triode is supplied to the grid of triodes 302 and 315. The output of triode 302 is applied directly to digit pulse filter 331, which consists of resistors 303, 304, 308, 310, capacitors 306, 309 and inductances 305 and 307. In showing the tube circuitry in FIG. 7 certain auxiliary and relatively minor components, as for example, load resistors and the like, are omitted in the interest of avoiding needless multiplicity of lines. The signal developed by digit pulse filter 331 is then amplified by duo triode amplifier 311 and applied to the grid of coincidence pentode 313 through variable resistor 312. The output of triode 315 is simultaneously applied to the grid of pentode 317, by way of grid leak resistors 316 and 342, and capacitor 341, comprising the synchronizing pulse filter represented by box 332 in FIG. 6. The output of pentode 317 is applied directly to the parallel arrangement of resistor 318 and diode 319 which arrangement comprises the amplitude selector section of the recognizer. The output of said amplitude selector section, together with the incoming cut off pulse are applied to duo triode 320, which comprises word gate generator 336. It will be understood that the said incoming cut-off pulse is generated by suitable time-controlled pulse generating means having a time relationship to the pulse input to triode 301, so that said cut-off pulse occurs a predetermined number of milliseconds following the initiation of the input pulses, the sequence interval being such as to correspond to the necessities of the code word cycle as described elsewhere herein. The output of word gate generator 336 is then applied through variable resistor 321 to the grid of pentode 313. Pentode 313 in response to the coincidental outputs of digit pulse filter 331 and word gate generator 336 acts as a word gate circuit 335 and provides the output signal, which output signal is amplified by the final amplifier stage consisting of duo triode 314 and triode 322.

The function of decoder 32 (FIG. 1) is essentially the inverse of that of coder 25; that is, the incoming serial number is converted into a parallel output register.

The incoming digital number, and the synchronizing pulse that precedes it, when applied to decoder 32, have the same rectangular waveform as the output of the ground coder. Prior to application of the signal to the decoder, said signal has been passed through the recognizer unit and has been freed of noise and distortion. When received, the synchronizing pulse initiates operation of a driving circuit that controls an electronic commutator. The latter distributes the digit pulses of the number into their corresponding output terminals. As in the case of the ground coder, the commutator is a matrix switch.

Figure 8:
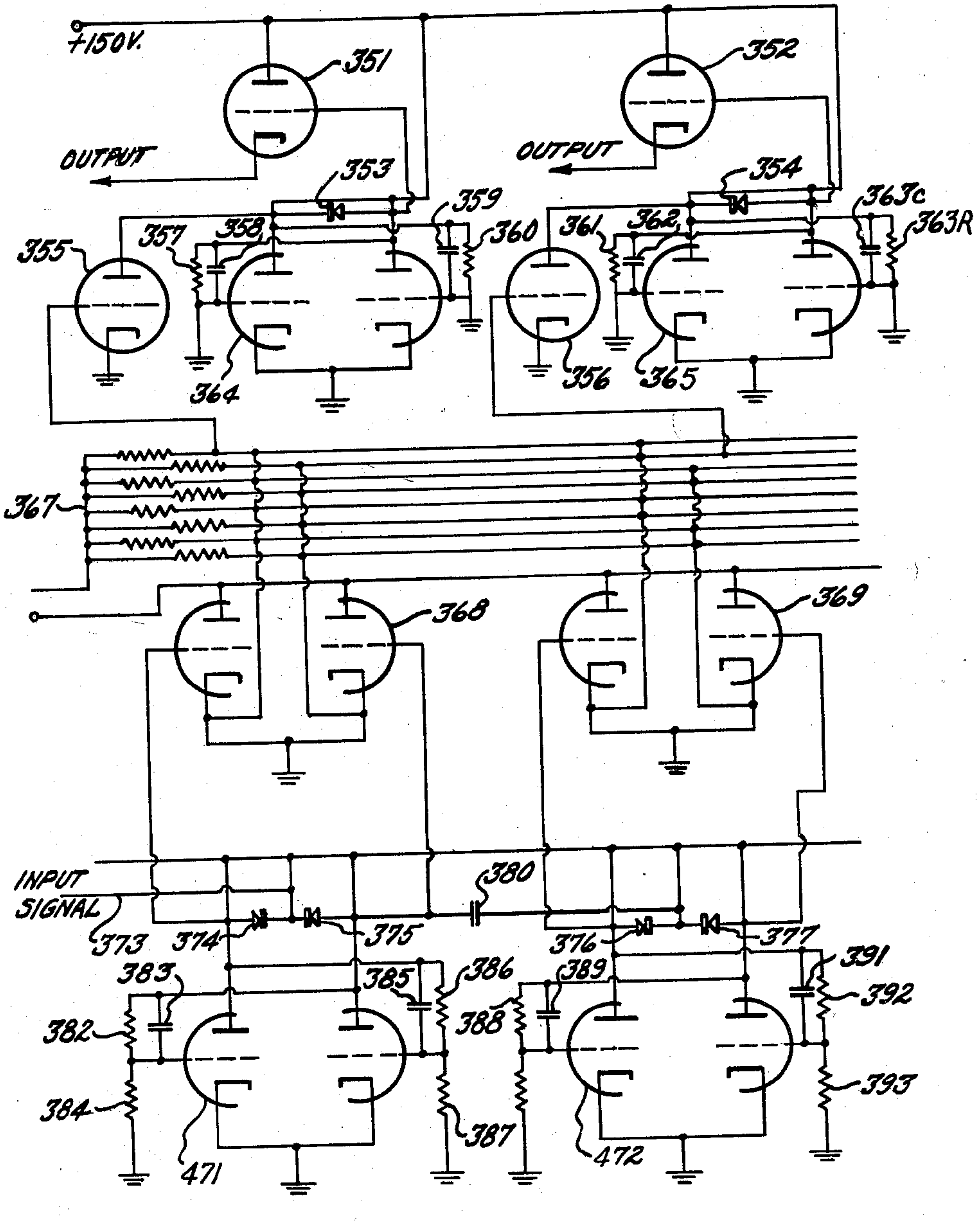
FIG. 8 illustrates a schematic wiring diagram of the decoder unit.

Input signals from the recognizer are passed through buffer and phase inverter stage 150 and are differentiated. The trailing edge of the synchronizing pulse triggers gating flip-flop 151 which "gates on" gated 1 kc. blocking oscillator 152. Successive blocking oscillator pulses are applied to counting chain of flip-flops 471–478 and drive eight position matrix switch 367 (FIGS. 1 and 8). The last flip-flop in the chain is coupled back to gating flip-flop 151, which shuts off gated 1 kc. blocking oscillator 152 after it has produced eight pulses.

In this way eight matrix output pulses occur in the proper sequence each time a number is received, for commutating its digits into parallel channels.

The entire decoder unit is illustrated in FIG. 1 including matrix switch 367 and its driver, a matrix interrogation circuit, and a parallel output register. Flip-flops 364–371 comprising the output register are D.-C. coupled to cathode followers 351–358 which feed coder parallel-output terminals 217–224. The coder unit must operate relays in the airborne transducer unit, and cathode followers 351–358 supply the power required to drive them.

FIG. 8 illustrates a schematic diagram of two typical stages of the eight stage matrix switch used in the decoder unit together with their associated flip-flop switches, amplifiers and cathode followers. The remaining six stages (not shown) are identical. Duo triodes 471, 472, 364 and 365 each comprise two tubes constituting, together, a single flip-flop stage, with the output terminal of the first triode of each multivibrator or flip-flop stage being coupled to the input terminal of the second triode so as to cause regeneration. A fixed bias is provided for each flip-flop stage by parallel combinations of resistors and capacitors connected between the grid of one stage and the cathode of the other. Thus, duo triode 471 has resistor 382 and capacitor 383 connected in parallel between the grid of a first triode stage and the anode of the second triode stage and resistor 386 and capacitor 385 connected in parallel between the grid of said second triode stage and the anode of said first triode stage. This arrangement provides a stable triode in which either triode may conduct until an input trigger pulse activates the switch. The same combination of resistances and capacitances are common to each flip-flop in the decoder unit. Any input signal pulse appearing on input lead 373 will cause one triode of duo triode 471 to conduct. Succeeding signal pulses will activate other appropriate flip-flops. The signal pulse generated by duo triode 471 is amplified by amplifier tube 368 and directly applied to the appropriate terminals of matrix switch 367. Matrix switch 367 serves to interrogate the various signals applied to it and to activate the parallel output register in response thereto. The output register is comprised of a plurality of flip-flops identical to those described above. Duo triode 364 together with associated resistors 357, 360 and capacitors 358, 359 comprises one of said output flip-flops. It is activated by a signal from matrix switch 367, said signal having been amplified by triode amplifier 355. The output of each flip-flop in the parallel output register actuates a cathode follower such as triode 351 in the instant case, thereby deriving the power necessary to operate relays in the airborne transducer unit.

Information relating to the status of the airborne instrumentality is transmitted to the ground station by a radar beacon system which operates in combination with and is an integral part of the subject invention. Radar Beacon 35 in the particular embodiment of our invention herein described comprises a conventional airborne radar beacon operating at S-band and having a peak power output of at least fifty watts. The ground beacon receiver is an S-band receiver of conventional design and is diplexed with scanning radar 22 on radar antenna 21.

Other components of the subject ground-air communication system may be of conventional design if used in the novel manner and combination herein described.

Modulator 26 is a two stage pulse amplifier with two cathode follower output circuits, one modulating the grid of the final stage of transmitter 27 and the other modulating the grid of the power amplifier stage. During the synchronizing pulse and during each one digit of a transmited command these grids swing the transmitter to full power output. At all other times they are held at cut-off and power output is zero.

Receiver 30 is a conventional aircraft radio receiver which has been modified for broad band pulse output and long time constant automatic volume control on noise. It is also supplemented by a low-noise preamplifier to provide a six db noise figure.

Transducer stage 33 comprises a plurality of binary-number-to-shaft-position-transducers, which devices accept eight digit binary numbers set up on relays or switches and, through the use of autopositioning mechanisms convert the eight digit binary number into a corresponding shaft position. Each unit consists of two identical four-digit converters. One converter, operating with the four most significant digits, develops a "coarse" shaft position, while the other develops a "fine" or vernier position. The two units are then added in a differential to give one of a possible two hundred and fifty-six positions.

Although the described embodiment is representative of the invention of the presently preferred form, it will be understood that various modifications may be made in carrying out the principle thereof. Since many changes could be made in the above construction and many widely different embodiments of this invention could be made without departing from the scope thereof, it is intended that all matter contained in the above description or shown in the accompanying drawings shall be interpreted as illustrative and not in a limiting sense.

What is claimed is:

1. An automatic ground-air communication system for transmitting supervisory and control intelligence to an airborne instrumentality comprising at a ground station, radar means capable of distinguishing targets within its range, means for putting into digital form the output of said radar means, means for continually computing from said digital information an azimuth command for said targets, means for encoding said computed information, and means for transmitting said coded information to certain preselected airborne instrumentalities in combination with at said airborne instrumentalities, means for receiving said transmitted coded information, and means for distinguishing said coded information from noise.

2. An automatic ground-air communication system for transmitting supervisory and control intelligence to an airborne instrumentality comprising, at a ground-station, radar means capable of distinguishing targets within its range, means for putting into digital form the output of said radar means, means for continually computing from said digital information an azimuth command for said targets means for encoding said information, a transmitter for said coded information, and means located at said airborne instrumentality for controlling the action of said airborne instrumentality in accordance with control signals delivered thereto by way of said transmitter.

3. An automatic ground-air communication system transmitting supervisory and control intelligence to an airborne instrumentality comprising at said airborne instrumentality means for receiving coded serial digital information, said coded serial digital information being transmitted from a ground station, recognizer means integrally connected to said receiver means for distinguishing between coded message and noise, decoding means for converting said received coded serial digital information into parallel digital pulses and transducer means for actuating said airborne instrumentality in accordance with said parallel digital pulses.

4. In an automatic ground-air communication system for transmitting supervisory and control intelligence to an airborne instrumentality a novel decoding means comprising input means adapted to receive a serial binary digital signal, means for differentiating said input signal, gate means responsive to said differentiated signal, blocking oscillator means, said blocking oscillator means being adapted to emit signal pulses in response to said gate means, counting means responsive to said signal pulses, said counting means consisting of a plurality of flip-flops, a matrix switch, said matrix switch being driven by said counting means and an output register, said output register consisting of a plurality of flip-flops, which last mentioned flip-flops provide a parallel binary digital signal in response to said matrix switch.

5. In an automatic ground-air communication system for transmitting supervisory and control intelligence to an airborne instrumentality a novel signal recognizing means comprising digit pulse filter means, synchronizing pulse filter means, noise filter means, means for applying a radio receiver output simultaneously to said digit pulse filter means, said synchronizing pulse filter means and said noise filter means, digit pulse proportional selector means responsive to said noise filter means and said digit pulse filter means, synchronizing pulse proportional selector means responsive to said synchronizing pulse filter means and said noise filter means, word gate generator means responsive to said synchronizing pulse proportional selector means, and word gate output means responsive to said digit pulse proportional selector means and said word gate generator means.

References Cited in the file of this patent

UNITED STATES PATENTS

| | | | |
|---|---|---|---|
| 2,825,054 | 2/58 | Ernst | 343—6 |
| 2,923,496 | 2/60 | Gordon | 343—7 |
| 3,053,487 | 9/62 | Baldwin et al. | 343—5 |
| 3,081,454 | 3/63 | Gabelman et al. | 343—6 |
| 3,088,098 | 4/63 | Moore | 179—15 |
| 3,096,513 | 7/63 | Cutler | 343—7 |

CHESTER L. JUSTUS, *Primary Examiner.*

MALCOLM A. MORRISON, *Examiner.*